(No Model.) 3 Sheets—Sheet 1.

J. N. FISK.
COMBINED DERRICK AND CARRIER.

No. 325,738. Patented Sept. 8, 1885.

(No Model.) 3 Sheets—Sheet 2.

J. N. FISK.
COMBINED DERRICK AND CARRIER.

No. 325,738. Patented Sept. 8, 1885.

WITNESSES
Will P. Robertson
Wm. Turner.

INVENTOR
John N. Fisk
By T. J. W. Robertson
Attorney.

(No Model.) 3 Sheets—Sheet 3.

J. N. FISK.
COMBINED DERRICK AND CARRIER.

No. 325,738. Patented Sept. 8, 1885.

WITNESSES
Will T. Robertson
Wm Turner

INVENTOR
John N. Fisk
by T. J. W. Robertson
Attorney.

UNITED STATES PATENT OFFICE.

JOHN N. FISK, OF ST. JAMES, NEW BRUNSWICK, CANADA.

COMBINED DERRICK AND CARRIER.

SPECIFICATION forming part of Letters Patent No. 325,738, dated September 8, 1885.

Application filed July 23, 1885. (No model.) Patented in Canada June 5, 1884, No. 30,777.

*To all whom it may concern:*

Be it known that I, JOHN N. FISK, a citizen of the Dominion of Canada, residing in the parish of St. James, in the county of Charlotte and Province of New Brunswick, Canada, have invented certain new and useful Improvements in Combined Derricks and Carriers, of which the following is a specification, reference being had therein to the accompanying drawings.

This invention relates to a device for raising, supporting, and carrying heavy articles—as rock—and may for purposes of this description be called a "combined derrick and carrier." The novelty consists in the construction, arrangement, and adaptation of parts, as will be more fully hereinafter set forth, and specifically pointed out in the claims. Upon the forward bolster or head-block and from near the rear axle I support strong frames, which, being secured together at the tops, form a strong and reliable derrick-frame. Stout side bars serve to maintain the relative positions of these parts, and they are placed sufficiently distant from each other to allow the article being operated upon to be drawn up between them. The derrick is mounted on stout but ordinary running-gear, and a hook from the upper cross-bar supports a block and tackle. The rope or chain of the tackle is wound upon a drum journaled in the rear portion of the frame, and a double crank carrying a pinion which meshes with a multiplying gear upon the drum furnishes means for revolving the drum and elevating the load. These gears may be thrown out of mesh when it is desired to lower the load, and a lever-brake allows the load to be lowered at will.

Figure 1:
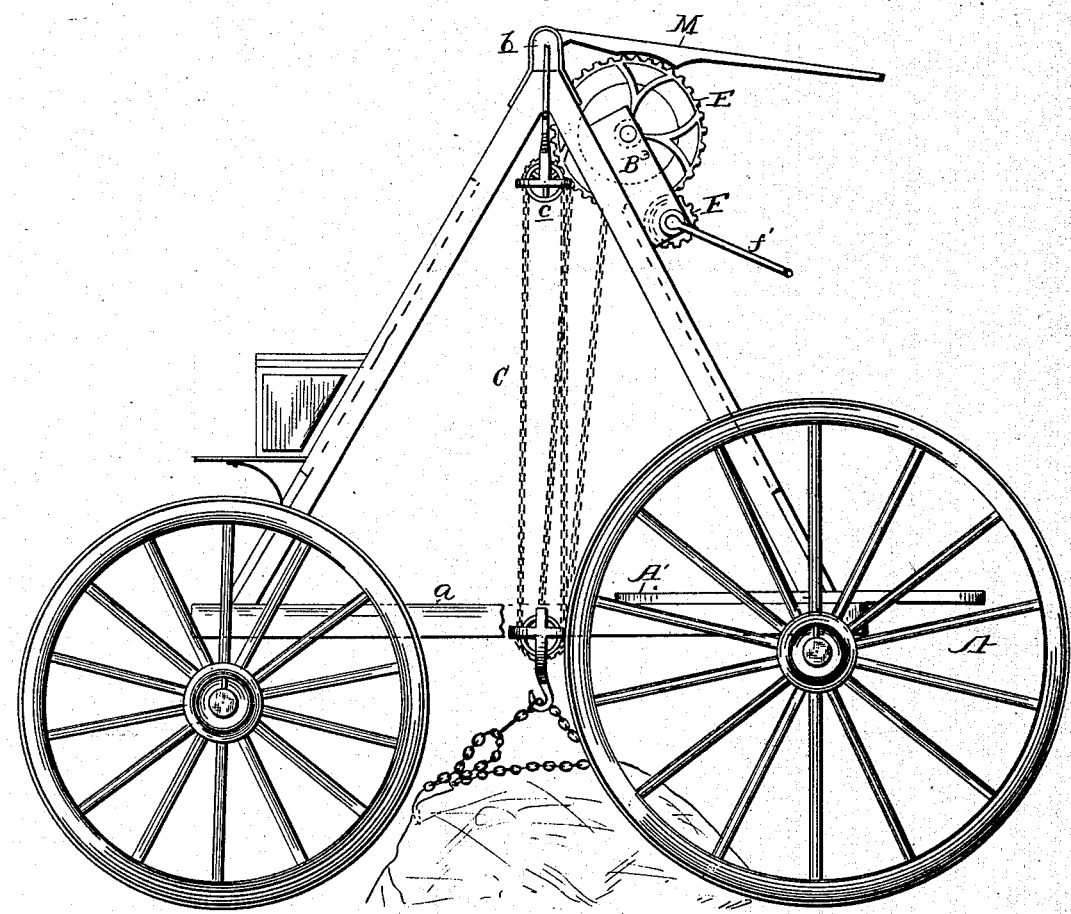
Figure 2:
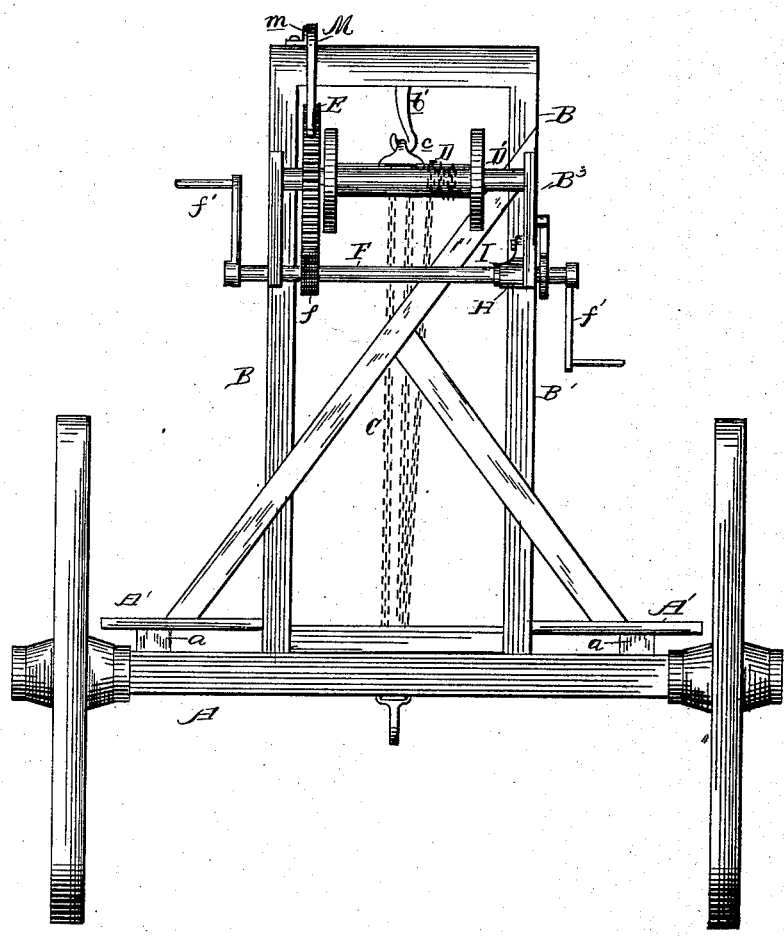
Figure 3:
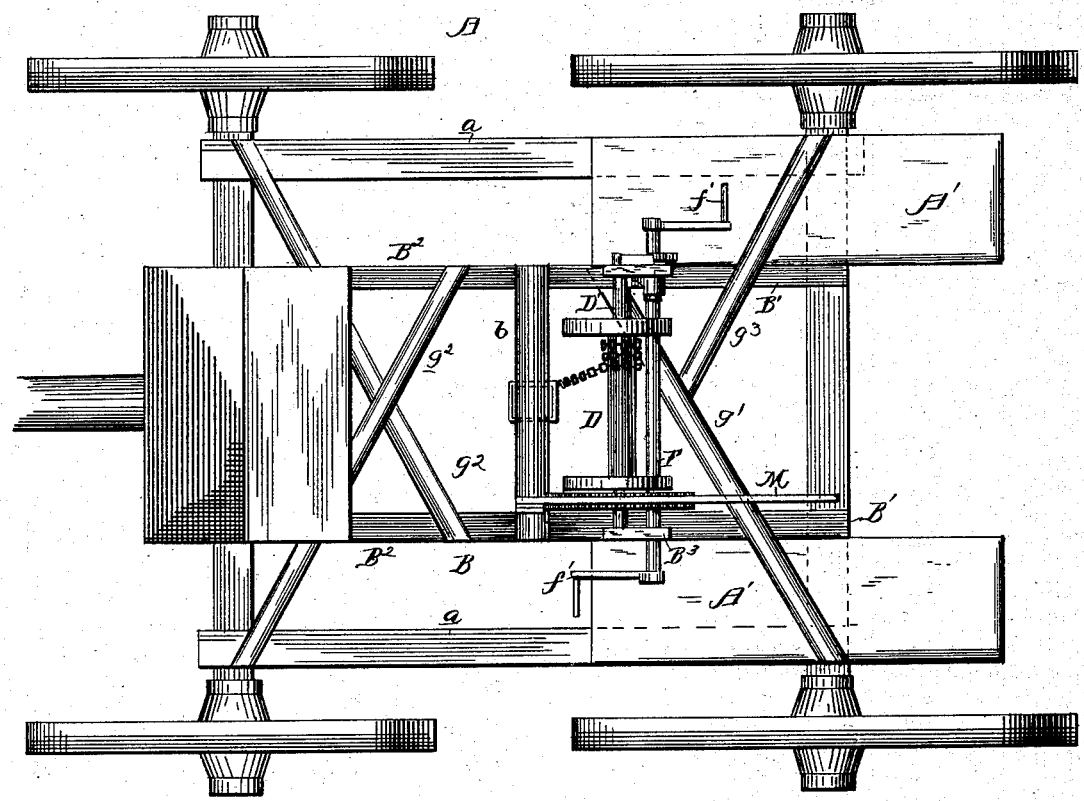

The invention is illustrated in the accompanying drawings, in which Figure 1 is a side elevation of the device; Fig. 2, a rear view, and Fig. 3 a plan.

Referring to the drawings, A designates the ordinary running-gear of a stout wagon, except that it has the side bars, $a$, arranged so far apart as to admit the rock or load being passed upward between them, and that a platform, A', is provided upon either side to allow standing place for the crank-operators. The derrick-frame B is composed of the inclined standard-frames B' and B², the former being supported at its bottom over the rear axle and the latter upon the forward head-block or bolster. They are connected at the top by a cross-bar, $b$, from the center of which depends a hook, $b'$, which supports the upper block, $c$, of the tackle C. In an extension B³ to the standards B' is journaled the drum-shaft D', and this is so arranged that the drum D lies directly over or nearly over the load, so as to give an approximately-direct strain to the tackle. At one end the drum-shaft D' carries a rigid gear, E, which in operation meshes with a pinion, $f$, upon a shaft, F, which shaft carries upon either end a crank, $f'$, arranged directly over the standing places or platforms A'. The standard-frame B² is braced by cross-braces $g^2$, but in order to make room for the convenient use of the gearing I provide the standards B' with one long brace, $g'$, and run a short brace, $g^3$, from the base up to the brace $g'$, as shown. The shaft F has longitudinal movement in its bearings, but is held with its pinion in mesh by a latch, H, which is pivoted at one end to the frame B³ and operates between the collars I on the shaft F. When it is desired to throw the pinion out of mesh with the gear-wheel E of the drum, it is only necessary to lift the latch out of contact with the collars I and move the shaft F endwise. The gear E may be provided with a friction-surface, or the lever M, pivoted at $m$ to the cross-bar $b$, may be caused to have frictional contact with the wheel-teeth; or the shaft F may, at the gear end thereof, be hung in movable bearings, which will allow the pinion $f$ to be thrown out of mesh when the lever-brake is in operation. In either case this brake is applied to the drum for the purpose of holding the drum until the gearing is thrown out of mesh and then lowering the load at will. The shaft F is arranged transverse to the plane of the machine to bring the cranks over the platforms, so that two men may work simultaneously.

The machine is adapted to be worked by two men, one of which is the driver, and the side bars, $a$, afford convenient footing by which said driver may pass from his seat to the platform A' and return.

What I claim as new is—

1. The combination, with the running-gear A, having side bars, $a$, and platform A', as described, the derrick-frame, the block and tackle, and the operating-cranks arranged on a transverse shaft, as set forth.

2. In a derrick and carrier as described, the combination, with the block and tackle, the drum and gear, and the shaft F, having provisions for throwing its pinion $f$ out of mesh, of the brake-lever M, arranged to apply friction to the drum and allow the load to be lowered at will, as specified.

3. In a machine as described, the combination, with the derrick-frame $B'$ $B^2$, having its braces $g'$ $g^2$ arranged to provide for gear mechanism, of the transverse drum, and shaft F, having collars I, the tackle, the pinion $f$, gear E, and the latch H, all arranged and adapted to serve with the running-frame having platforms A', as and for the purposes set forth.

In testimony whereof I affix my signature, in presence of two witnesses, this 20th day of July, 1885.

JOHN N. FISK.

Witnesses:
   ANDREW MANN,
   L. A. MILLS.